(12) United States Patent
Vitali et al.

(10) Patent No.: US 8,814,189 B2
(45) Date of Patent: Aug. 26, 2014

(54) SUSPENSION ELEMENT HAVING A HYDRAULIC STRUT CONNECTED TO A PRESSURE ACCUMULATOR AND INDEPENDENT SUSPENSION USING THE SAME

(71) Applicants: Mario Vitali, Drummondville (CA); Mounsif Sarif, Quebec (CA); Denis Lagace, Saint-Germain-de-Grantham (CA)

(72) Inventors: Mario Vitali, Drummondville (CA); Mounsif Sarif, Quebec (CA); Denis Lagace, Saint-Germain-de-Grantham (CA)

(73) Assignee: MS Gregson

( * ) Notice: Subject to any disclaimer, the term of this patent is extended or adjusted under 35 U.S.C. 154(b) by 0 days.

(21) Appl. No.: 13/706,942

(22) Filed: Dec. 6, 2012

(65) Prior Publication Data
US 2014/0159333 A1    Jun. 12, 2014

(51) Int. Cl.
*B60G 9/02*    (2006.01)
*B60G 11/26*    (2006.01)

(52) U.S. Cl.
USPC ...... 280/124.157; 280/124.116; 280/124.153; 280/124.154

(58) Field of Classification Search
USPC .................. 280/124.116, 124.153, 124.154, 280/124.157
See application file for complete search history.

(56) References Cited

U.S. PATENT DOCUMENTS

| | | | | |
|---|---|---|---|---|
| 2,812,953 | A * | 11/1957 | Ronning | 280/124.105 |
| 3,047,283 | A * | 7/1962 | Kivell | 267/201 |
| 3,582,106 | A * | 6/1971 | Keijzer | 267/64.19 |
| 3,884,496 | A * | 5/1975 | Ito et al. | 280/6.158 |
| 4,614,247 | A * | 9/1986 | Sullivan | 180/24.02 |
| 5,052,712 | A * | 10/1991 | Raidel | 280/5.515 |
| 5,269,556 | A * | 12/1993 | Heyring | 280/5.508 |
| 6,460,643 | B1 * | 10/2002 | Degelman | 180/89.12 |
| 6,942,232 | B1 * | 9/2005 | McGhie | 280/124.112 |
| 6,964,317 | B2 * | 11/2005 | Groves et al. | 180/344 |
| 7,213,824 | B1 * | 5/2007 | McGhie | 280/124.112 |
| 7,264,079 | B2 * | 9/2007 | Bordini | 180/253 |
| 7,273,117 | B2 * | 9/2007 | Pond | 180/24.02 |
| 7,472,914 | B2 * | 1/2009 | Anderson et al. | 280/5.519 |
| 7,562,887 | B1 * | 7/2009 | Sutton et al. | 280/124.112 |
| 7,673,719 | B2 * | 3/2010 | Buschena | 180/344 |
| 7,900,942 | B2 * | 3/2011 | Koschinat | 280/124.111 |
| 7,967,101 | B2 * | 6/2011 | Buschena | 180/344 |
| 8,172,032 | B2 * | 5/2012 | Buschena | 180/344 |
| 2007/0145705 | A1 * | 6/2007 | Ramsey et al. | 280/124.128 |
| 2007/0194550 | A1 * | 8/2007 | Wadelton | 280/124.116 |
| 2007/0222169 | A1 * | 9/2007 | Smith et al. | 280/124.157 |
| 2009/0212522 | A1 * | 8/2009 | Stuart et al. | 280/124.109 |

* cited by examiner

*Primary Examiner* — Drew Brown

(57) ABSTRACT

The present disclosure relates to a suspension element for maintaining a wheel on a frame of a vehicle. The suspension element can be attached to the frame via a fixed support. The wheel can be mounted to an arm that is pivotably connected to the fixed support. A hydraulic strut resists a pivoting movement of the arm in relation to the fixed support. A pressure accumulator comprises a gas chamber and a fluid chamber separated by a diaphragm. The fluid chamber is in fluid connection with the hydraulic strut. A movement of the arm relative to the fixed support causes a change of pressure in the pressure accumulator. An independent suspension comprising two such suspension elements is also disclosed. The two suspension elements comprise extensions of the fixed support mounted on the frame so that two wheels are coaxial when mounted on the frame.

14 Claims, 7 Drawing Sheets

SUSPENSION ELEMENT HAVING A HYDRAULIC STRUT CONNECTED TO A PRESSURE ACCUMULATOR AND INDEPENDENT SUSPENSION USING THE SAME

TECHNICAL FIELD

The present disclosure relates to the field of vehicular suspensions. More specifically, the present disclosure relates to a suspension element having a hydraulic strut connected to a pressure accumulator and to an independent suspension using two such suspension elements.

BACKGROUND

Vehicles, and more particularly trailers, are subject to important forces applied vertically on their wheels, especially under acceleration and deceleration conditions. Conventional suspensions use springs and shock absorbers to mediate impact of these forces. Springs may comprise helical springs, leaf springs, or air springs. Shock absorbers mostly in use comprise oil-filled or air-filled devices. Coil and shock suspension systems are generally bulky and are usually not easily modifiable or configurable.

Therefore, there is a need for suspension elements that economically provide improved riding safety and comfort.

SUMMARY

According to the present disclosure, there is provided a suspension element for maintaining a wheel on a frame of a vehicle. A fixed support is adapted for attachment of the suspension element to the frame. An arm is adapted for mounting the wheel thereon, the arm being pivotably connected to the fixed support. A hydraulic strut is configured for resisting pivoting of the arm in relation to the fixed support. A pressure accumulator comprises a gas chamber and a fluid chamber separated by a diaphragm, the fluid chamber being in fluid connection with the hydraulic strut so that a movement of the arm relative to the fixed support causes a change of pressure in the pressure accumulator.

According to the present disclosure, there is also provided an independent suspension for maintaining two wheels on a frame of a vehicle. Two suspension elements each comprise a fixed support, an arm adapted for mounting one of the two wheels thereon, the arm being pivotably connected to the fixed support, a hydraulic strut for resisting pivoting of the arm in relation to the fixed support, a pressure accumulator, and an extension attached to the fixed support and extending perpendicularly from a movement of the arm relative to the fixed support. The pressure accumulators each comprise a gas chamber and a fluid chamber separated by a diaphragm, the fluid chamber being in fluid connection with a corresponding hydraulic strut so that the movement of the arm relative to the fixed support causes a change of pressure in the pressure accumulator. The extensions of the two suspension elements are mountable on opposite sides of the frame so that the two wheels are coaxial when mounted on the frame.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Various aspects of the present disclosure generally address one or more of the problems related to economically providing improved riding safety and comfort in vehicles.

In one or more embodiments, a suspension system comprises a hydraulic strut that is compressed or extended when a supported wheel moves up and down. The hydraulic strut is fluidly connected to a fluid chamber of a pressure accumulator that also comprises a gas chamber separated from the fluid chamber by a diaphragm. Fluid from the hydraulic strut moves towards or from the pressure accumulator as the hydraulic strut is compressed or extended. The hydraulic strut performs at least in part a damping function of the suspension system. The pressure accumulator stores energy when fluid moves in and returns the energy as fluid returns to the hydraulic strut. As such, the pressure accumulator acts as a spring of the suspension system.

The following terminology is used throughout the present disclosure:

Fixed support: an element that is in a fixed relation with a frame of a vehicle.

Arm: a slender structural element.

Strut: an element adapted to resist movement in a direction of its length.

Hydraulic strut: a strut using oil or similar liquid for resisting movement.

Pressure accumulator: a reservoir for maintaining a fluid under pressure.

Fluid connection: capability of two (or more) elements to exchange fluids therebetween.

Flow restriction device: device that limits an amount of fluid, either gaseous or liquid.

Damping rate: a measure of control of motion provided in a suspension system.

Spring rate: a measure of deflection of a suspension system as a function of a load.

Figure 1:
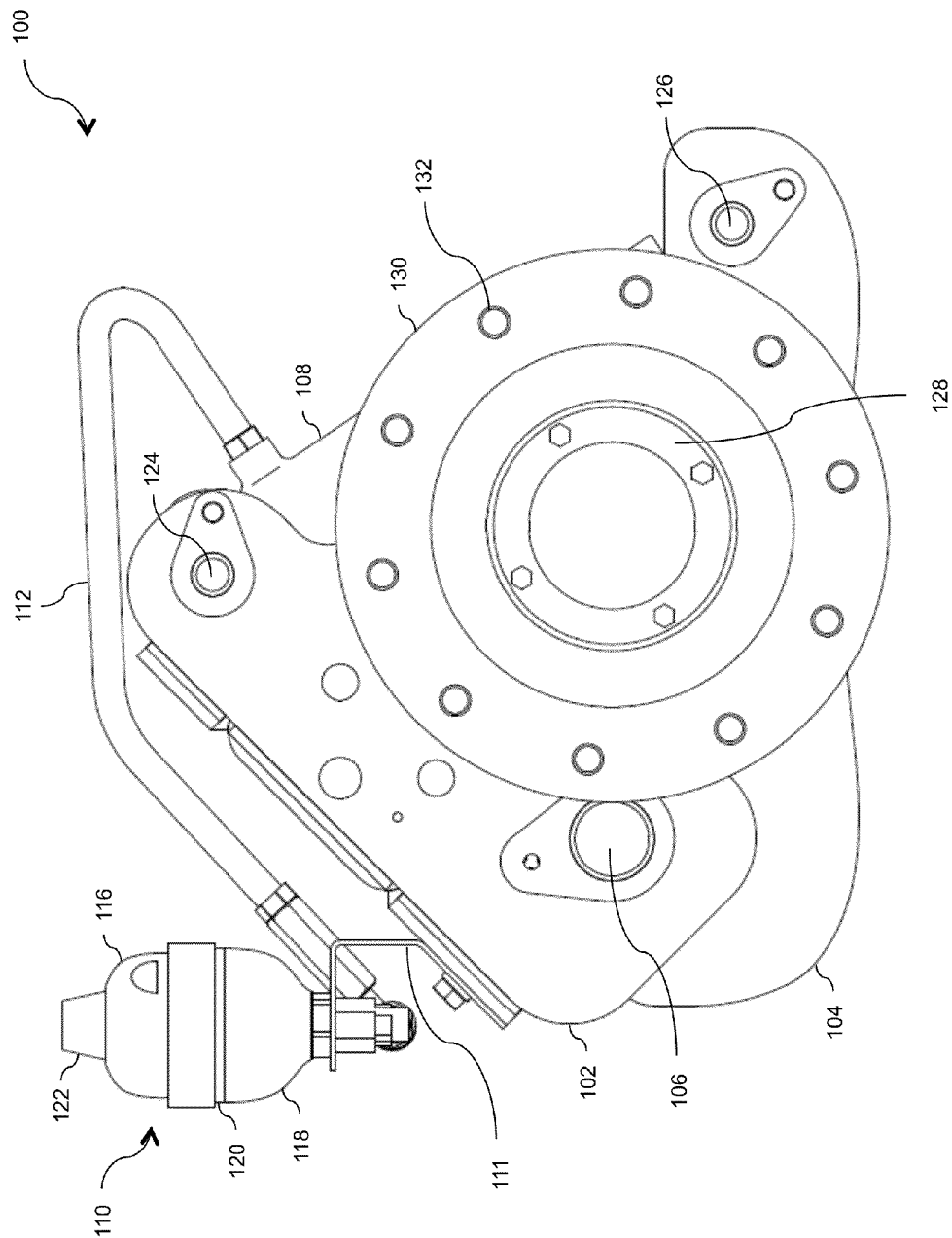
FIG. 1 is a side elevation view of a suspension element according to an embodiment.
Figure 2:
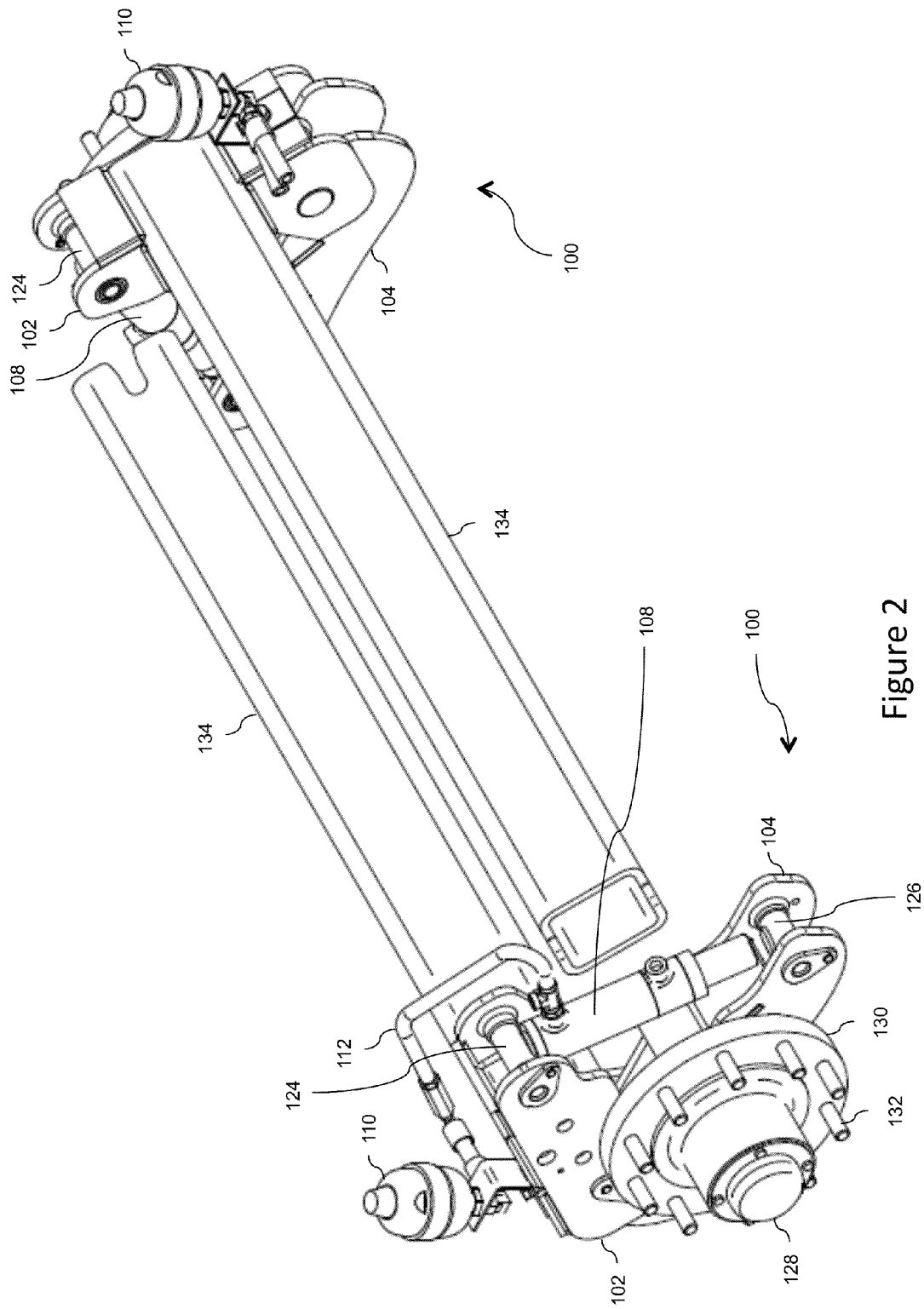
FIG. 2 is a perspective view of an independent suspension comprising two suspension elements of FIG. 1 and extensions for attachment to a vehicle frame.
Figure 3:
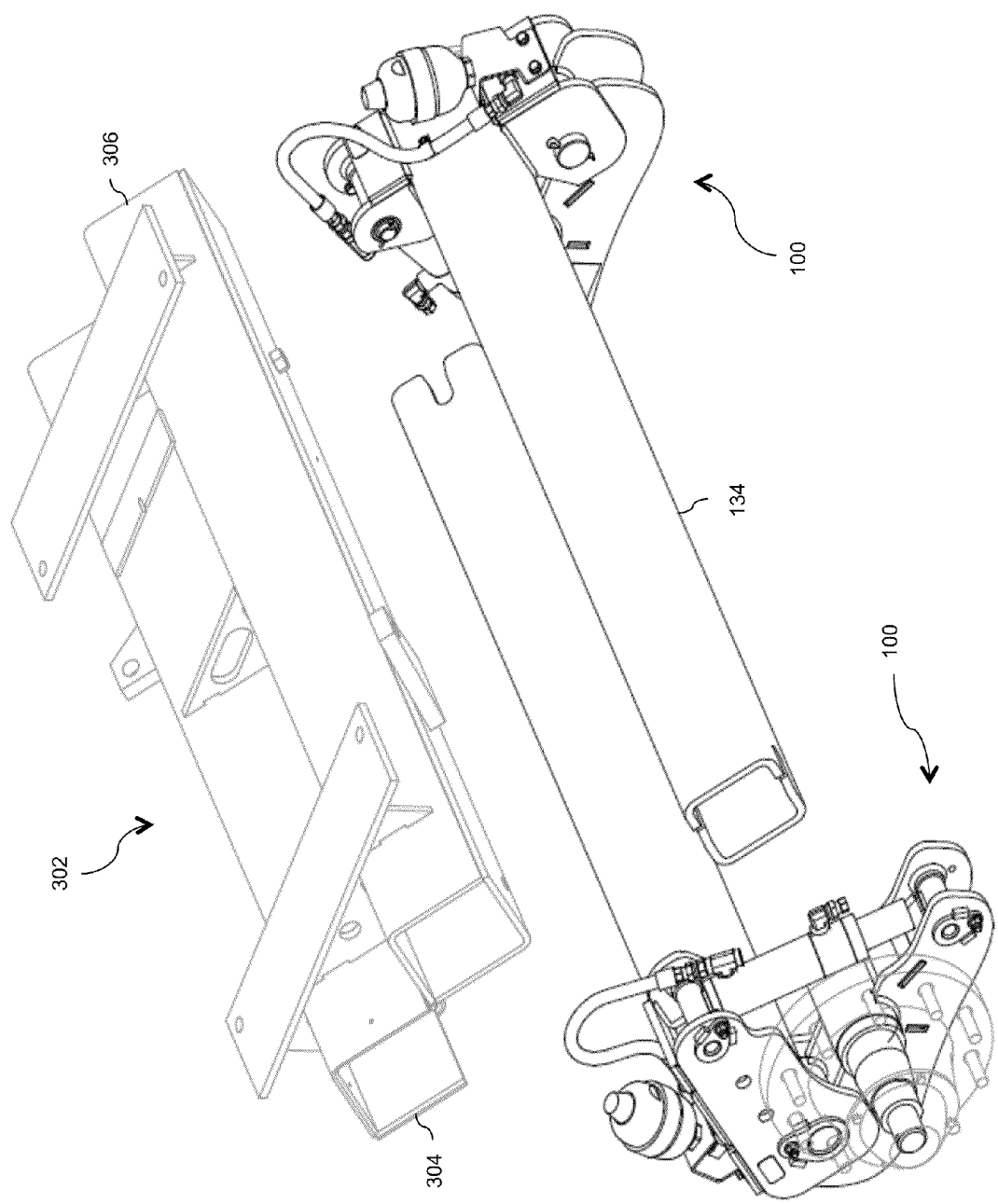
FIG. 3 is a perspective view of the independent suspension of FIG. 2 shown near a subframe.
Figure 4:
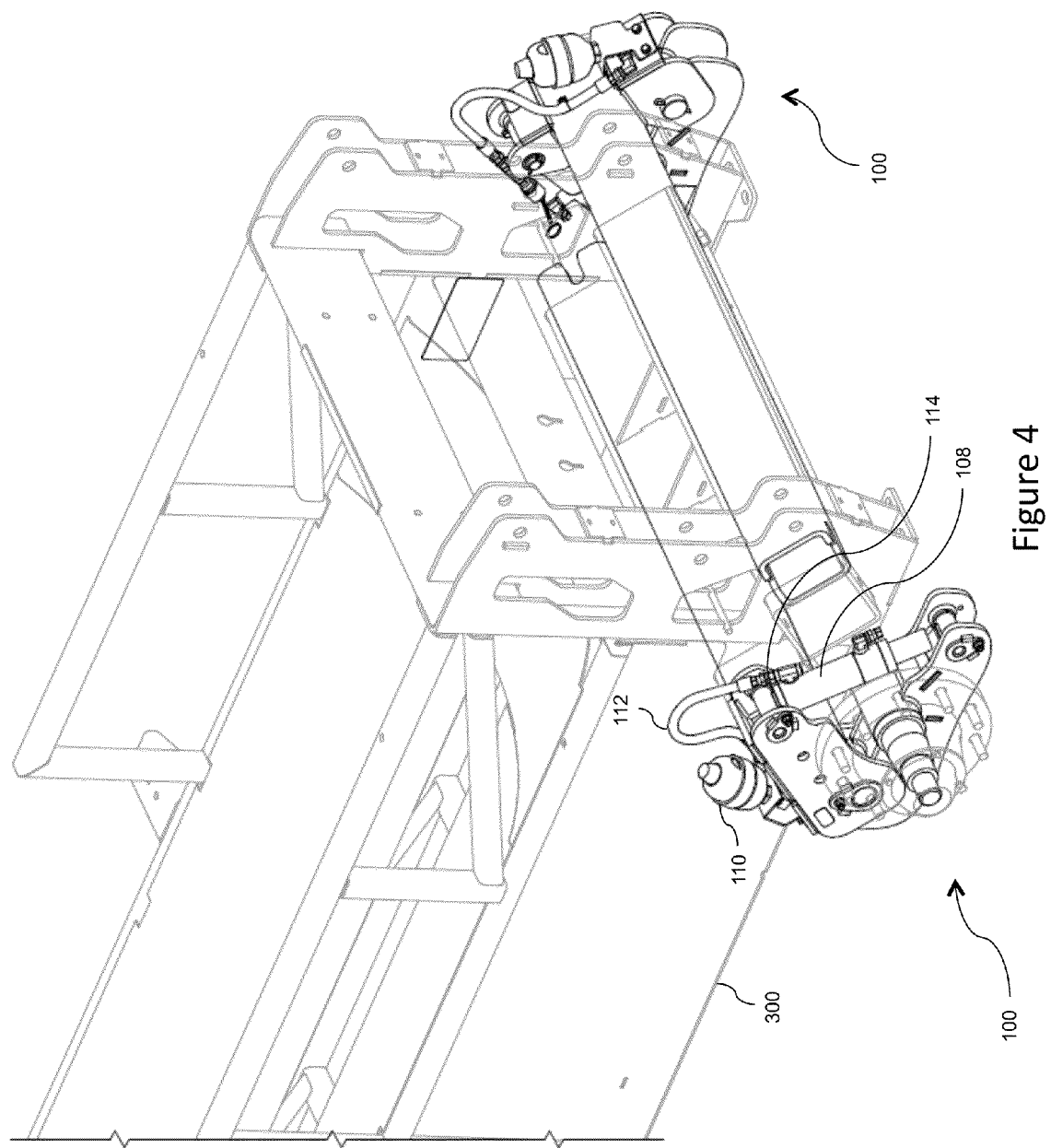
FIG. 4 is a perspective view of the independent suspension of FIG. 2 mounted on the subframe of FIG. 3, the subframe being mounted on a vehicle frame.
Figure 5:
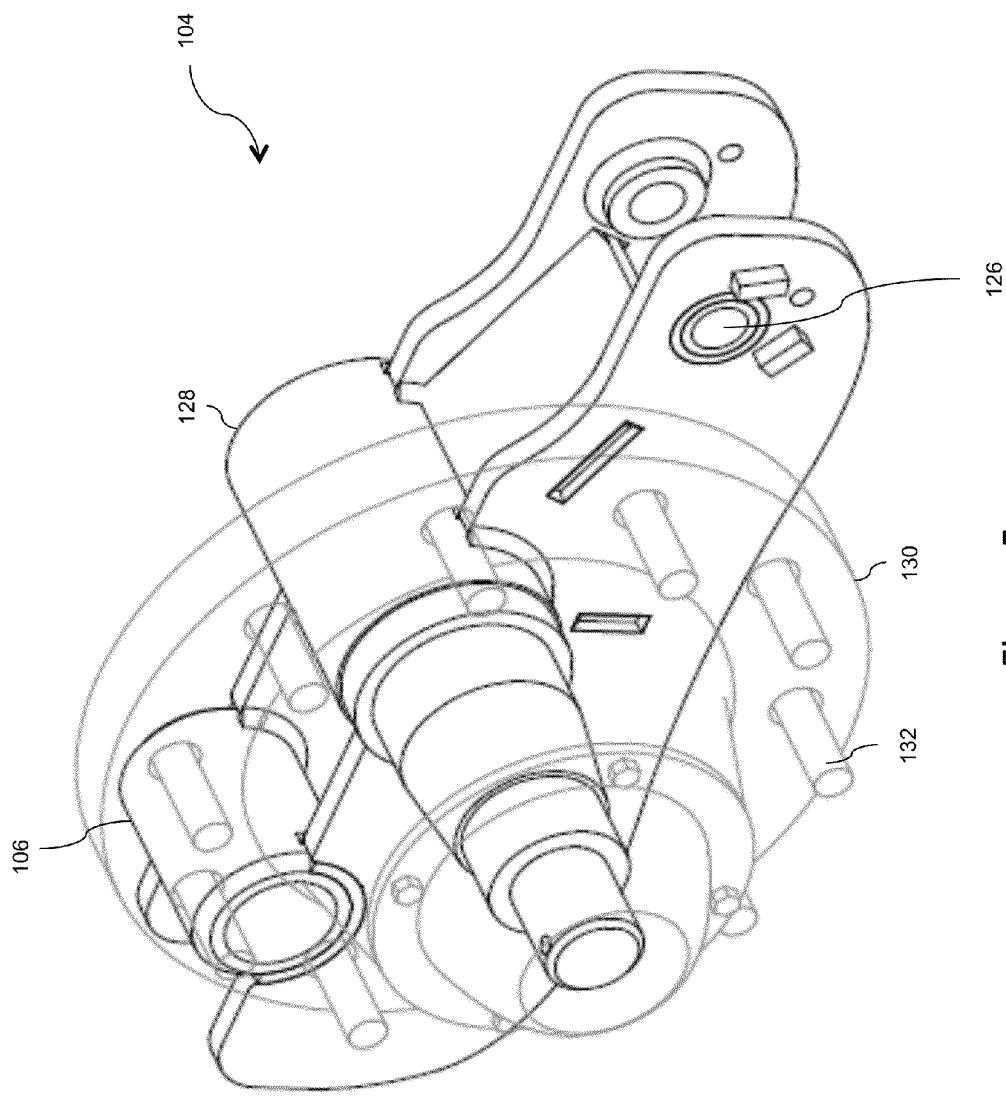
FIG. 5 is a detailed perspective view of a suspension arm of the suspension element of FIG. 1, shown with a wheel hub.
Figure 6:
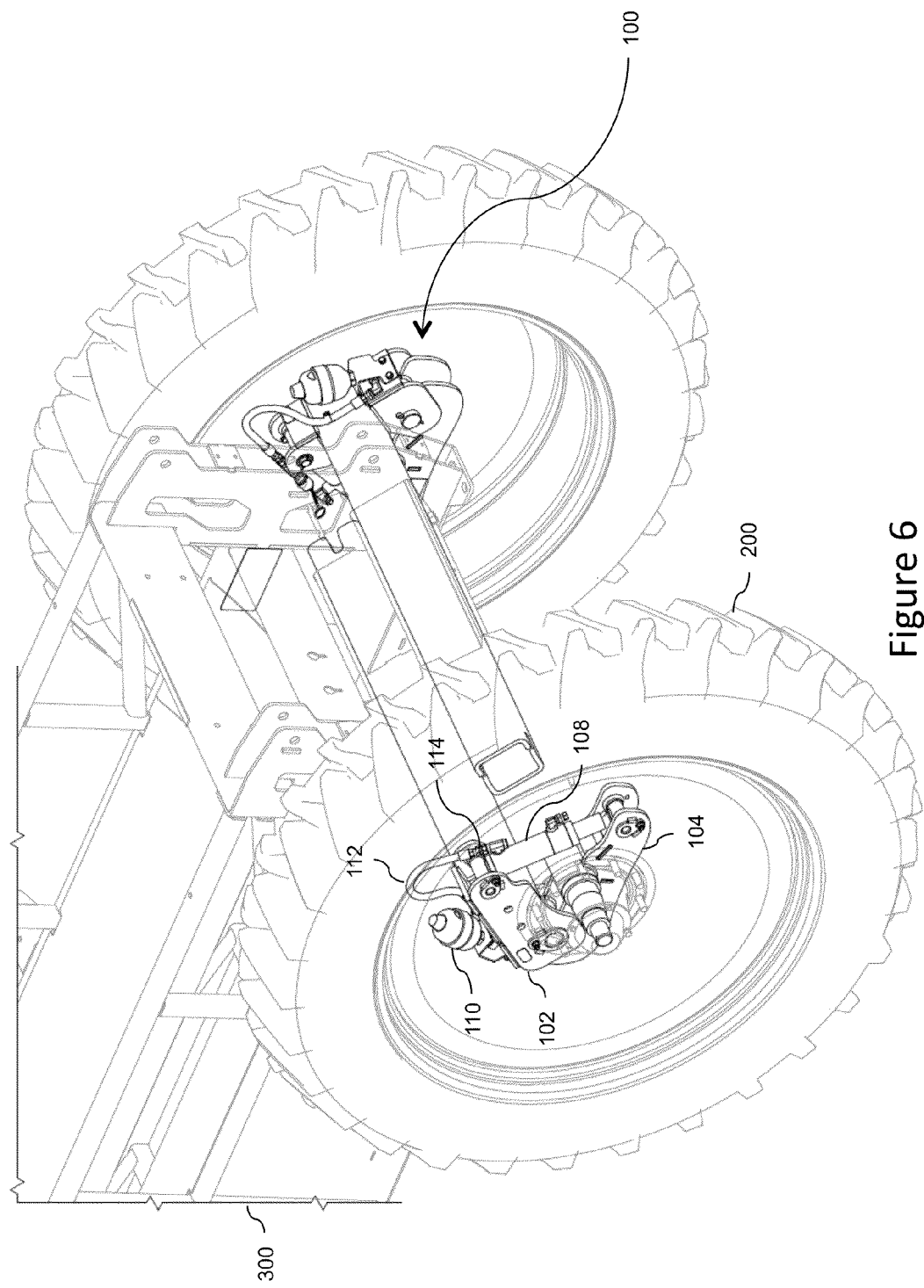
FIG. 6 is a detailed perspective view of a hydraulic strut and of a pressure accumulator of the suspension element of FIG. 1.

Referring now to the drawings, FIG. 1 is a side elevation view of a suspension element according to an embodiment. FIG. 2 is a perspective view of an independent suspension comprising two suspension elements of FIG. 1 and extensions for attachment to a vehicle frame. FIG. 3 is a perspective view of the independent suspension of FIG. 2 shown near a subframe. FIG. 4 is a perspective view of the independent suspension of FIG. 2 mounted on the subframe of FIG. 3, the subframe being mounted on a vehicle frame. FIG. 5 is a detailed perspective view of a suspension arm of the suspension element of FIG. 1, shown with a wheel hub. FIG. 6 is a detailed perspective view of a hydraulic strut and of a pressure accumulator of the suspension element of FIG. 1. The present disclosure is best understood by referring at once to FIGS. 1-6, in which like numerals represent like features on the various drawings.

A suspension element 100 is made for maintaining a wheel 200 on a frame 300 of a vehicle (not explicitly shown). The suspension element 100 comprises a fixed support 102 adapted for attachment of the suspension element 100 to the frame 300. An arm 104 of the suspension element 100 is adapted for mounting the wheel 200 thereon. The arm 104 is pivotably connected to the fixed support 104 via a pivot 106. A hydraulic strut 108 of the suspension element 100, for example a shock absorber, resists pivoting of the arm 104 in relation to the fixed support 102. A pressure accumulator 110 of the suspension element 100 is in fluid connection with the hydraulic strut 108 via a conduit 112. The pressure accumulator 110 may be attached to the fixed support 102, for example via a bracket 111. Alternatively, the pressure accumulator 110 may be attached to the frame 300. A movement of the arm 104 relative to the fixed support 102 causes a change of pressure in the pressure accumulator 110.

The pressure accumulator 110 comprises a gas chamber 116 and a fluid chamber 118 separated by a diaphragm—not explicitly shown but located generally at area identified as reference 120 on FIG. 1. The fluid chamber 118 is in fluid connection with the hydraulic strut 108 via the conduit 112. As the hydraulic strut 108 extends or compresses from movements of the arm 104 in relation to the fixed support 102, fluid flows from or to the fluid chamber 118. Modifications of a volume of the fluid chamber 118 cause changes of volume and pressure within the gas chamber 116. These changes of pressure may vary depending on a volume and initial pressure of the gas chamber 116. A spring rate of the suspension element 100 is therefore defined at least in part by a preset pressure of the gas chamber 116 and by a volume of the gas chamber 116. Of course, mechanical compliance of other components of the suspension element 100 may also modestly affect its spring rate.

As shown on FIGS. 4 and 6, the conduit 112 providing the fluid connection between the pressure accumulator 110 and the hydraulic strut 108 may comprise a flow restriction device 114. A damping rate of the suspension element 100 may thus be defined at least in part by an internal resistance of the hydraulic strut 108 and by a resistance of the flow restriction device 114. In the absence of the flow restriction device 114, the damping rate of the suspension element 100 is mainly defined by the internal resistance of the hydraulic strut 108 and by intrinsic flow resistance of the conduit 112. Flow resistance of other elements and mechanical friction, as well as heat buildup and dissipation, may also affect the damping rate of the suspension element 100.

The preceding paragraphs explain how a damping rate and a spring rate of the suspension element 100 are defined. Several options may be used to calibrate the suspension element 100. For this purpose, one or more of the following parameters may be adjusted, either when manufacturing the suspension element 100, at the time of installation of the suspension element 100, or on-site thereafter depending on a load on the suspension element. These parameters include:

A) a preset pressure of the gas chamber 116, which may be modified on-site via a valve 122 of the gas chamber 116;
B) a volume of the gas chamber 116, which may be determined by design of the suspension element 100, though the gas chamber 116 may be changeable on-site;
C) an internal resistance of the hydraulic strut 108, which may be determined by design of the suspension element 100, though the hydraulic strut 108 may be changeable on-site;
D) a resistance of the flow restriction device 114, which may be adjustable or changeable on-site.

Of course, any combination of the above four (4) parameters may be adjusted in calibrating the suspension element 100. It is expected that some calculation as well as trial-and-error may be required of the person of ordinary skill in the art in order to arrive at a proper calibration of the suspension element 100. This undertaking would however a level of effort not unlike what is normally required to tune any conventional suspension according to a particular vehicle configuration.

In the embodiment illustrated on FIG. 1, the arm 104 is connected at one end to one end of the fixed support 102 via the pivot 106. One end of the hydraulic strut 108 is pivotably attached to an opposed end the fixed support 102 via a pivot 124. An opposed end of the hydraulic strut 108 is pivotably attached to an opposed end the arm 104 via a pivot 126. In this particular configuration, the fixed support 102, the arm 104 and the hydraulic strut 108 form a generally triangular shape articulated at the pivots 106, 124 and 126. As illustrated on FIG. 1, an initial (unloaded) angle between the arm 104 and the fixed support 102 define an initial elongation of the hydraulic strut 108 such that the hydraulic strut 108 will operate in compression under most load conditions. Shapes, lengths and configuration of the fixed support 102, or the arm 104, of the hydraulic strut 108, as well as positioning of the pivots 106, 124 and 126, will be selected by those of ordinary skill in the art according to the needs of a particular application, depending for example on a vehicle size, frame size, wheel size and weight, load on the vehicle, and the like.

The suspension element 100 may comprise a hub 128 for mounting of the wheel 200 on the suspension element 100. As best seen on FIG. 5, the hub 128 is mounted to the arm 104, for example by welding of the hub 128 on the arm 104. The hub 128 is mounted perpendicularly from a movement of the arm relative to the fixed support. Mounting the hub 128 substantially midway along a length of the arm 104, between the pivots 106 and 126 as shown for example on FIG. 5, reduces forces applied on the hydraulic strut 108 to a fraction of forces applied on the wheel 200. As is well known, the hub 128 may further be attached to a hub flange 130 having a plurality of threaded studs 132 for attachment of the wheel 200 with nuts (not shown).

For mounting of the suspension element 100 to the frame 300, an extension 134 may be attached to the fixed support 102, for example by welding. The extension 134 projects perpendicularly from a movement of the arm 104 relative to the fixed support 102. The extension 134 can be mounted to a subframe 302 by insertion through openings 304 and 306 of the subframe 302, the subframe 302 being mounted to the frame 300. As illustrated, the extension 134 has a square cross-section and is adapted for insertion through comparatively shape openings 304 and 306 of the subframe 302. The extension 134 may be bolted or welded to the subframe 302 or otherwise attached to the subframe 302 in any conventional manner, the subframe 302 being also mounted to the frame 300 in any conventional manner. For some applications, it may be desired to only partially insert the extensions 134 through openings 304 and 306 of the subframe 302. This provides the possibility to alter a track width of the vehicle by adapting a distance between wheels 200 on both sides of the frame 300. Apertures (not shown) may be made along a length of the extensions 134 and of the subframe 302 for installation of bolts (not shown) or other inserts for maintaining a desired track width. The extensions 134 and the subframe 302 may be made of strong material having sufficient gauge to allow incomplete insertion of the extensions 134 within the subframe 302.

Most conventional suspension systems comprise, on a same axle, two opposed symmetric sides mirroring each other. For example, a control arm for attaching a left suspension and wheel to the left side of a frame mirrors a control arm for attaching a right suspension and wheel to the right side of the frame. The control arms, and in fact many elements of such suspension systems, are produced specifically for installation on the left side or on the right side of a vehicle. As such, these parts are not interchangeable between opposed sides of an axis.

In an aspect, the present disclosure introduces an independent suspension for maintaining two wheels on a frame of a vehicle, comprising two suspension elements such as the suspension element 100 introduced hereinabove. The two suspension elements 100 may be substantially symmetric and mirror each other, as in conventional suspension systems. Alternatively, a first suspension element 100 and a second suspension element 100 may be substantially identical, the second suspension element 100 being rotated by 180 degrees relative to the first suspension element 100, as shown for example on FIG. 2. Those of ordinary skill in the art will appreciate that two substantially identical suspension elements 100 intended for mounting on opposed sides of the frame 300 may share common parts while some other parts of these suspension elements 100 may differ slightly. As a non-limiting example, parts used for interconnection of the two suspension elements 100 to the frame 300, for example the extensions 134, may need to be adapted between suspension elements 100 intended for mounting on a left side or on a right side of the frame 300, according to particulars of attachment points (not specifically shown) of the frame 300.

In any case, each suspension element 100 of the independent suspension comprises the same components introduced hereinabove, including a fixed support 102, an arm 104 adapted for mounting one of the two wheels 200 thereon, the arm 104 being pivotably connected to the fixed support 102. Each suspension element 100 also comprises a hydraulic strut 108 for resisting pivoting of the arm 104 in relation to the fixed support 102 and a pressure accumulator 110 comprising a gas chamber and a fluid chamber separated by a diaphragm, the fluid chamber being in fluid connection with the hydraulic strut 108 so that a movement of the arm 104 relative to the fixed support 102 causes a change of pressure in the pressure accumulator 110. An extension 134 is attached to each fixed support 102 and extends perpendicularly from a movement of the arm 104 relative to the fixed support 102. Mounting the extensions 134 on opposite sides of the frame 300 so that the two wheels 200 are coaxial when mounted on the frame 300 ensures solid attachment of the suspension elements 100 and of the wheels 200 to the vehicle.

In a variant, the two suspension elements 100 may mirror each other, one of the two suspension elements 100 being configured as shown on the various Figures for mounting on a left side of the frame and another one of the two suspension elements 100 being configured for mounting on a right side of the frame. Though this variant is not explicitly shown, those of ordinary skill in the art will appreciate that extensions of mirroring suspension elements may be shorter than the extensions 134 illustrated on the various Figures in order to provide clearance to one another. Alternatively, two mirroring suspension elements 100 may share a single extension 134.

In another variant, as shown for example on FIG. 3, the two suspension elements 100 may be identical or substantially identical. A first extension 134 of a first suspension element 100 and a second extension 134 of a second suspension element 100 are mountable at an offset on the frame 300, the second suspension element being rotated by 180 degrees relative to the first suspension element.

Figure 7:
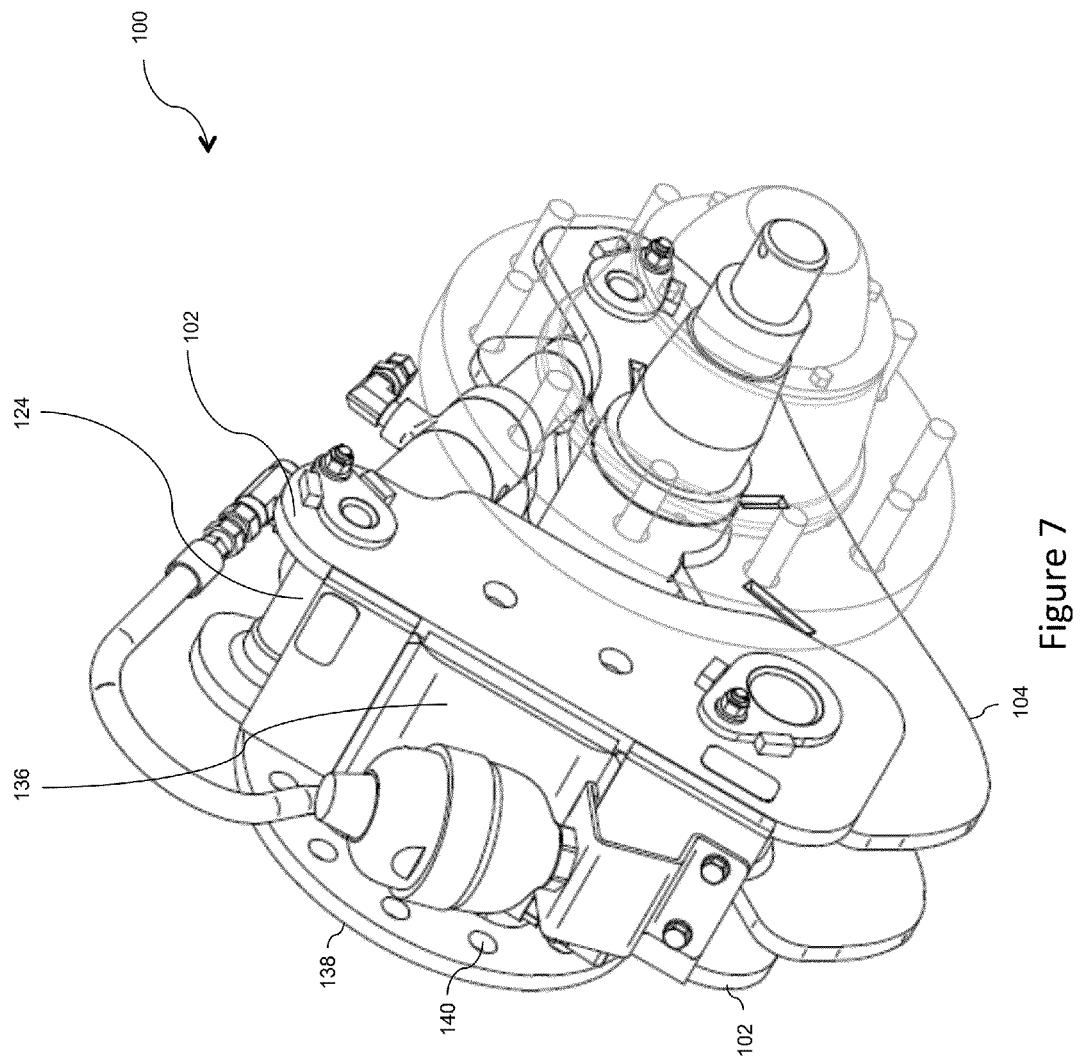
FIG. 7 is a perspective view of the suspension element of FIG. 1 showing a variant replacing the extensions of FIG. 2 for attachment to a vehicle frame.

FIG. 7 is a perspective view of the suspension element of FIG. 1 showing a variant replacing the extensions of FIG. 2 for attachment to a vehicle frame. A shorter support block 136 is attached to the suspension element 100, the support block 136 being fixedly attached to a mounting disk 138 comprising apertures 140 for bolting to the frame 300. The support block 136 and the mounting disk 138 may be cast as a unitary piece or may be welded or bolted together. Using the support block 136 and mounting disk 138 combination, the suspension element 100 may be mounted in the frame 300 without the subframe 302. Presence of a plurality of apertures 140 allows mounting the suspension element 100 at various angles and/or at various attachment points (not shown) of the frame 300.

Those of ordinary skill in the art will realize that the description of the suspension element and independent suspension are illustrative only and are not intended to be in any way limiting. Other embodiments will readily suggest themselves to such persons with ordinary skill in the art having the benefit of the present disclosure. Furthermore, the disclosed suspension element and independent suspension may be customized to offer valuable solutions to existing needs and problems of economically providing improved riding safety and comfort.

In the interest of clarity, not all of the routine features of the implementation of the suspension element and of the independent suspension are shown and described. It will, of course, be appreciated that in the development of any such actual implementation of the suspension element and of the independent suspension, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of vehicular suspensions having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A suspension element for maintaining a wheel on a frame of a vehicle, comprising:
   a fixed support adapted for attachment of the suspension element to the frame;
   an arm adapted for mounting the wheel thereon, the arm being pivotably connected to the fixed support;
   a hydraulic strut for resisting pivoting of the arm in relation to the fixed support; and
   a pressure accumulator comprising a gas chamber and a fluid chamber separated by a diaphragm, the fluid chamber being in fluid connection with the hydraulic strut so that a movement of the arm relative to the fixed support causes a change of volume of the fluid chamber, thereby causing a change of volume and pressure within the gas chamber.

2. The suspension element of claim 1, wherein a spring rate of the suspension element is defined at least in part by a pressure of the gas chamber and by a volume of the gas chamber.

3. The suspension element of claim 1, wherein the fluid connection between the fluid chamber and the hydraulic strut comprises a conduit and a flow restriction device.

4. The suspension element of claim 3, wherein a damping rate of the suspension element is defined at least in part by an internal resistance of the hydraulic strut and by a resistance of the flow restriction device.

5. The suspension element of claim 3, wherein the suspension element is calibrated using an element selected from a preset pressure of the gas chamber, a volume of the gas chamber, an internal resistance of the hydraulic strut, a resistance of the flow restriction device, and any combination thereof.

6. The suspension element of claim 1, wherein:
the arm is connected at one end to one end of the fixed support;
one end of the hydraulic strut is pivotably attached to an opposed end the fixed support;
an opposed end of the hydraulic strut is pivotably attached to an opposed end the arm,
whereby the fixed support, the arm and the hydraulic strut form a generally triangular shape.

7. The suspension element of claim 6, comprising a hub for mounting the wheel thereon, the hub being mounted to the arm, perpendicularly from the movement of the arm relative to the fixed support, between the end of the arm and the opposed end of the arm.

8. The suspension element of claim 7, wherein the hub is mounted substantially midway along a length of the arm.

9. The suspension element of claim 1, comprising an extension attached to the fixed support and extending perpendicularly from the movement of the arm relative to the fixed support, the extension being mountable to the frame.

10. An independent suspension for maintaining two wheels on a frame of a vehicle, comprising:
two suspension elements, each suspension element comprising:
a fixed support;
an arm adapted for mounting one of the two wheels thereon, the arm being pivotably connected to the fixed support;
a hydraulic strut for resisting pivoting of the arm in relation to the fixed support;
a pressure accumulator comprising a gas chamber and a fluid chamber separated by a diaphragm, the fluid chamber being in fluid connection with the hydraulic strut so that a movement of the arm relative to the fixed support causes a change of pressure in the pressure accumulator; and
an extension attached to the fixed support and extending perpendicularly from the movement of the arm relative to the fixed support, the extension being mountable to the frame;
wherein the extensions of the two suspension elements are mountable on opposite sides of the frame so that the two wheels are coaxial when mounted on the frame.

11. The independent suspension of claim 10, wherein:
one of the two suspension elements is configured for mounting on a left side of the frame; and
another one of the two suspension elements is configured for mounting on a right side of the frame.

12. The independent suspension of claim 10, wherein:
the first suspension element and the second suspension element are substantially identical; and
the second suspension element is rotated by 180 degrees relative to the first suspension element for mounting at an offset from the first suspension element on the frame.

13. The independent suspension of claim 10, wherein:
the extensions of the two suspension elements are mountable on opposite sides of the frame by full or partial insertion of the extensions in a subframe;
whereby a track width of the vehicle is variable.

14. A suspension element for maintaining a wheel on a frame of a vehicle, comprising:
a fixed support adapted for attachment of the suspension element to the frame;
an arm adapted for mounting the wheel thereon, the arm being pivotably connected to the fixed support;
a hydraulic strut for resisting pivoting of the arm in relation to the fixed support; and
a pressure accumulator comprising a gas chamber and a fluid chamber separated by a diaphragm, the fluid chamber being in fluid connection with the hydraulic strut so that a movement of the arm relative to the fixed support causes a change of pressure in the pressure accumulator;
wherein:
the arm is connected at one end to one end of the fixed support;
one end of the hydraulic strut is pivotably attached to an opposed end of the fixed support;
an opposed end of the hydraulic strut is pivotably attached to an opposed end of the arm; and
the fixed support, the arm and the hydraulic strut form a generally triangular shape.

* * * * *